March 29, 1927.
J. H. JOHNSON
PRESSURE GAUGE
Filed Oct. 8, 1923
1,622,517
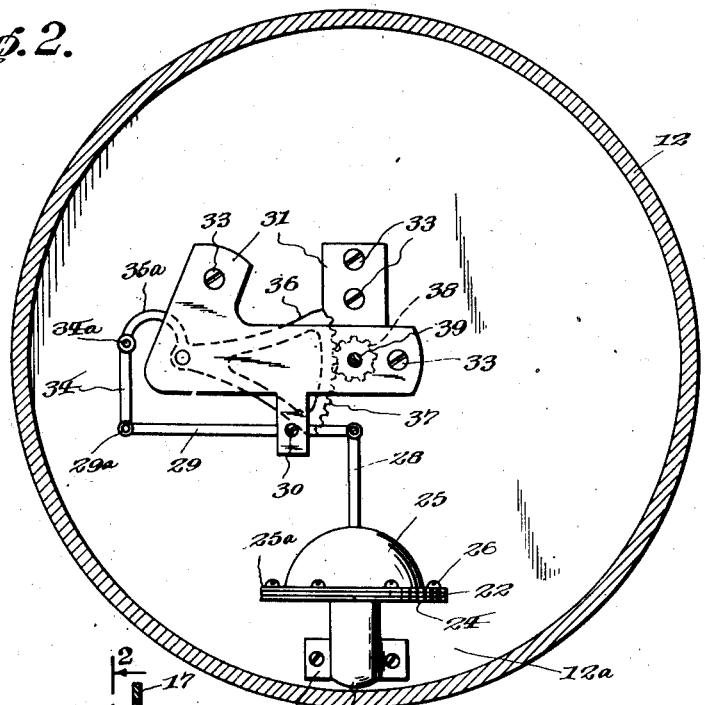
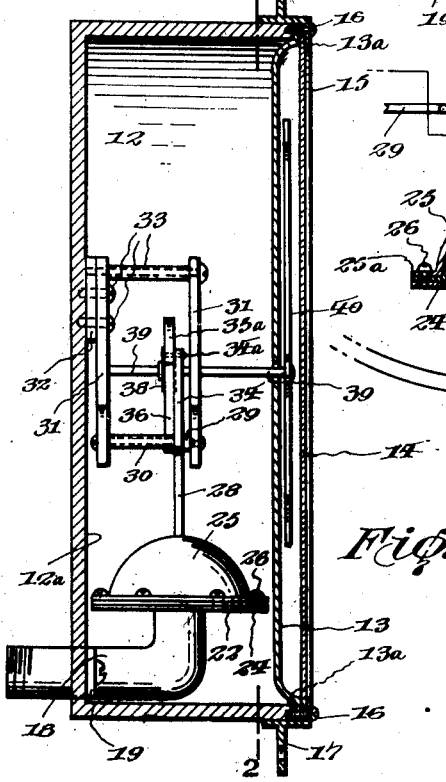
Inventor:
John H. Johnson.
By Milo B. Stevens
Attorneys.

Patented Mar. 29, 1927.

1,622,517

UNITED STATES PATENT OFFICE.

JOHN H. JOHNSON, OF CHICAGO. ILLINOIS.

PRESSURE GAUGE.

Application filed October 8, 1923. Serial No. 667,330.

My invention relates to pressure gauges or indicators, and more particularly to that class of gauges used in motor cars to indicate the level of fuel in the gasoline tank by the medium of varying air pressure occasioned by the rise or fall of the fuel in the tank. Gauges of this type are supplied by an air lead from the fuel tank, and embody an element which is sensitive to the pressure of the air, the extent to which such element is influenced being indicated by a pointer movable on a graduated dial.

In gauges of the above type, accuracy of the indication is usually problematic, owing to the apparent lack of sensitivity in the affected element to the delicate variations of the air pressure induced by the liquid level in the fuel tank. It is therefore my main object to provide a pressure-actuated element which is peculiarly designed for the special use outlined and is therefore highly sensitive.

A further object of the invention is to design the same for full working capacity, yet sufficiently small to fit the mechanism compartment of gauges of extending types.

Another object of the invention is to design the same on simple lines and of sturdy construction, whereby to operate efficiently and withstand road vibration incident to motor car use.

With the above objects in view, and any others which may suggest themselves from the specification and claims to follow, a better understanding of the invention may be had by reference to the accompanying drawing, in which—

Figure 1 is a vertical section of a typical pressure gauge with my improvement incorporated;

Fig. 2 is a section on the line 2—2 of Fig. 1;

Fig. 3 is a section of the novel pressure-actuated element in inactive position; and Fig. 4 is a similar view of the same under pressure.

Referring specifically to the drawing, the indicator housing is generally denoted by 12, being ordinarily positioned on the dash board of the car. The front of the housing 12 is open and receives a dish-like dial 13 the flanged circumferential edge 13ª of which is apertured and rests against the front edge of the housing.

The circumferential edge of the glass housing window 14 rests against the inner edge of the dial flange 13ª and the assembly is held in place by a flanged ring 15 carried by the outer wall of the housing, this ring being apertured to permit the passage of screws 16 through the apertures of the dial flange 13ª and into the front edge of the housing. Apertured ears 17 projecting from the ring 15 are adapted to receive screws for retaining the housing in a socket in the vehicle dashboard.

The indicating means and its actuating mechanism will now be described.

Entering through the rear wall 12ª of the housing 12 is an L-shaped pipe section 18 to which the pipe from the fuel tank is attachable. This pipe section 18 will be rigidly attached to the housing by any preferred means, screw receiving integral ears 19 being illustrated in the drawing.

The inner end of the pipe section 18 terminates in a reduced threaded nipple 20 the same being insertible through the central openings of a relatively stiff concavo convex disk 21 and a superposed flexible rubber disk 22, a nut 23 serving to clamp the same against the shoulder surrounding the nipple 20. The circumferential edge of the rubber disk 22 extends beyond the edge concavo-convex disk 21 and is clamped between a ring 24 and the circumferential flange 25ª of a rigid dome 25 by means of screws 26 as clearly shown in Figs. 5 and 6. This construction provides an air chamber 27 within the dome 25 and the flexible rubber disk 22 constituting the bottom thereof permits the rising of the rigid dome 25 upon the introduction of air pressure in the chamber as will be presently apparent, which rising controls the indicating element.

Rigidly attached to the medial portion of the dome 25 is a pin 28 having a pivotal connection with an arm 29 which is fulcrumed intermediate its ends upon one of the spacing pins 30 disposed between and connecting two irregularly shaped bracket members 31, the inner of which is attached to a cleat 32 on the rear housing wall 12ª by means of screws or other fasteners 33. The opposite end of the arm 29 is pivoted at 29ª to a link 34 the free end of which in turn is pivoted as shown at 34ª to the arcuate integral end 35ª of a rocker member 36 the opposite end of which is provided with a gear segment 37. The teeth of the gear segment 37 mesh with a pinion 38 keyed to upon a shaft 39 journalled in bearings in the bracket members 31 the end of said shaft extending through the central opening of the dial 13 and carrying the pointer 40 movable over the graduated face of the dial.

From the foregoing description read in connection with the accompanying drawing the structural details of my invention will be readily understood and appreciated by those skilled in the art. The operation may be summarized as follows:

Assuming the fuel tank to be empty and therefore devoid of fuel-induced air pressure, the rubber disk 22 carrying the dome 25 will be in the position indicated in Fig. 3, supported upon the concavo-convex disk 21 the function of which is to maintain the dome in spaced relation to the top of the nipple 20 so that the same will be always open to allow passage of air into the chamber 27. Another function of the concavo-convex disk 21 is to prevent wearing of the rubber disk 22 on the shoulder edges of the pipe section 18. With the parts in the relation shown in Fig. 3, liquid is poured into the tank and has the effect by its fall to induce a pressure of air in the conduit terminating with the pipe section 18, the air so compressed leading into the chamber as the liquid level in the tank rises. This action results in the raising of the dome 25 as shown in Fig. 4 with the consequent actuation of the pointer 40 through its connection with the dome. On the other hand, when the pressure of the fuel decreases the weight of the dome causes the same to fall and—as the pressure continues to decrease—to depress the limp disk 22 until it completely surmounts and encases the same. This action gives the dome a comparatively long stroke, which of course gives the indicator greater latitude.

The dial 13 will be graduated in any preferred manner the graduation indicating the tank capacity being so positioned as to register with the pointer 40 when the tank is full while the graduation at the other extremity of the pointer's path of movement will indicate an empty tank. The intermediate graduation may be determined in an obvious manner.

While I have described and illustrated herein the preferred embodiment of my invention in accordance with the patent statutes, yet it will be distinctly understood that I do not propose to limit myself strictly thereto since various changes and modifications will immediately suggest themselves to those skilled in the art without departing from the spirit of the invention the scope of which is defined by the following claims.

What I claim as new and desire to secure by Letters Patent is:

1. A pressure-responsive device comprising a rigid dome, a limp-material disk under the dome and hermetically attached to the rim thereof, and a fixedly supported air conduit leading into the dome by way of the center of the disk and supporting the disk and dome, said dome responding of its weight to a reduction of the pressure, and the said disk yielding to the fall of the dome.

2. A pressure-responsive device comprising a rigid dome, a limp-material disk under the dome and hermetically attached to the rim thereof, and a fixedly supported air conduit leading into the dome by way of the center of the disk and supporting the disk and dome, said dome effecting a falling stroke upon a reduction of the pressure by depressing and encasing the disk.

3. A transmitting device for a gauge operated by air pressure comprising a dome, a flexible disk supporting the dome at the rim and hermetically attached thereat, an air conduit leading into the dome by way of the disk, a flange carried by the conduit to seat the disk, and a gauge-operating connection carried by the dome.

In testimony whereof I affix my signature.

JOHN H. JOHNSON.